United States Patent [19]
Miles et al.

[11] Patent Number: 5,726,826
[45] Date of Patent: *Mar. 10, 1998

[54] CAPSTANLESS HELICAL DRIVE SYSTEM

[75] Inventors: Robert J. Miles, Niwot; James Zweighaft; Steven P. Georgis, both of Boulder, all of Colo.

[73] Assignee: Exabyte Corporation, Boulder, Colo.

[ * ] Notice: The term of this patent shall not extend beyond the expiration date of Pat. No. 5,680,269.

[21] Appl. No.: 469,865

[22] Filed: Jun. 6, 1995

Related U.S. Application Data

[63] Continuation of Ser. No. 150,730, Nov. 12, 1993, Pat. No. 5,602,694, and a continuation of Ser. No. 337,620, Nov. 10, 1994, which is a continuation-in-part of Ser. No. 150,726, Nov. 12, 1993, abandoned.

[51] Int. Cl.$^6$ .......................... G11B 15/52; G11B 5/027
[52] U.S. Cl. ...................... 360/84; 360/73.12; 360/73.01
[58] Field of Search .......................... 360/84, 85, 77.13, 360/77.14, 70, 73.11, 73.01, 73.12

[56] References Cited

U.S. PATENT DOCUMENTS

| | | | |
|---|---|---|---|
| 3,528,309 | 9/1970 | Laybourn . | |
| 3,831,196 | 8/1974 | Thorpe | 360/52 |
| 3,984,868 | 10/1976 | Ragle et al. | 360/73 |
| 4,107,745 | 8/1978 | Burke et al. | 360/73 |
| 4,125,881 | 11/1978 | Eige et al. | 360/50 |
| 4,157,488 | 6/1979 | Allan | 318/7 |
| 4,370,683 | 1/1983 | Greig et al. | 360/73 |
| 4,448,368 | 5/1984 | Skalko | 242/186 |
| 4,794,473 | 12/1988 | Kawasaki | 360/70 |
| 4,835,628 | 5/1989 | Hinz et al. | 360/48 |
| 4,843,495 | 6/1989 | Georgis et al. | 560/77.15 |
| 5,012,989 | 5/1991 | Whyte, Jr. et al. | 242/186 |
| 5,065,261 | 11/1991 | Hughes et al. | 360/70 |
| 5,068,757 | 11/1991 | Hughes et al. | 360/77.13 |
| 5,142,422 | 8/1992 | Zook et al. | 360/54 |
| 5,191,491 | 3/1993 | Zweighaft | 360/77.13 |

FOREIGN PATENT DOCUMENTS

| | | |
|---|---|---|
| 55-80844 | 9/1980 | Japan . |
| 1-113946 | 5/1989 | Japan . |
| 1-170342 | 7/1989 | Japan . |
| 3-219459 | 9/1991 | Japan . |
| 3-219459 | 12/1991 | Japan . |

OTHER PUBLICATIONS

The DAT Conference Standard, Jun. 1987, pp. 22–26.

*Primary Examiner*—Stuart S. Levy
*Assistant Examiner*—William J. Klimowicz
*Attorney, Agent, or Firm*—Nixon & Vanderhye, P.C.

[57] ABSTRACT

A capstanless helical scan recording system (14) comprises a supply reel (24); a take-up reel (26); and a media transport path (20) extending from the supply reel to the take-up reel. A drum (30) is positioned along the media transport path and has a read head (R1,R2) and a write head (W1,W2) mounted thereon for recording and reading information in helical stripes on the media. The take-up reel comprises a rotor assembly (60), a rotating hub assembly (70), and a gearing system. The rotor assembly includes a sun gear (80) which rotates at a first rotational speed. The rotating hub assembly rotates carries three planetary gears (160) and imparts a velocity to media transported in the media transport path. The gearing system meshes with the rotor assembly and with the hub assembly for causing the hub assembly to have a greater rotational speed than the rotor assembly. The gearing system preferably has a gear ratio on the order of about 8:1. A tension arm (44) protrudes into the media transport path and decouples the supply reel to compensate for reel runout during high speed operation. The system has no further means other than the take-up reel and the supply reel for imparting impetus to the media along the media transport path.

15 Claims, 12 Drawing Sheets

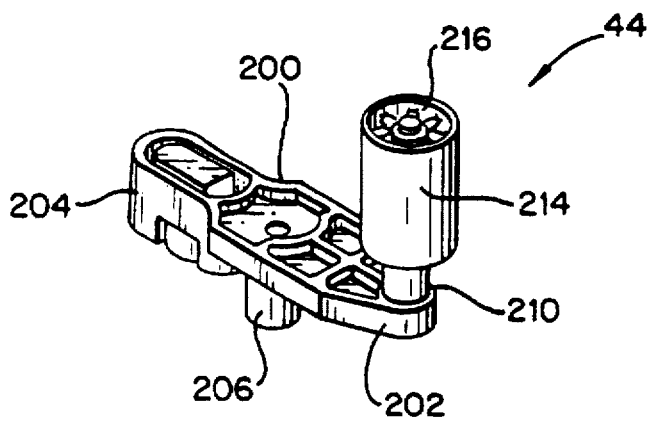
Fig. 8(A)
Fig. 8(B)
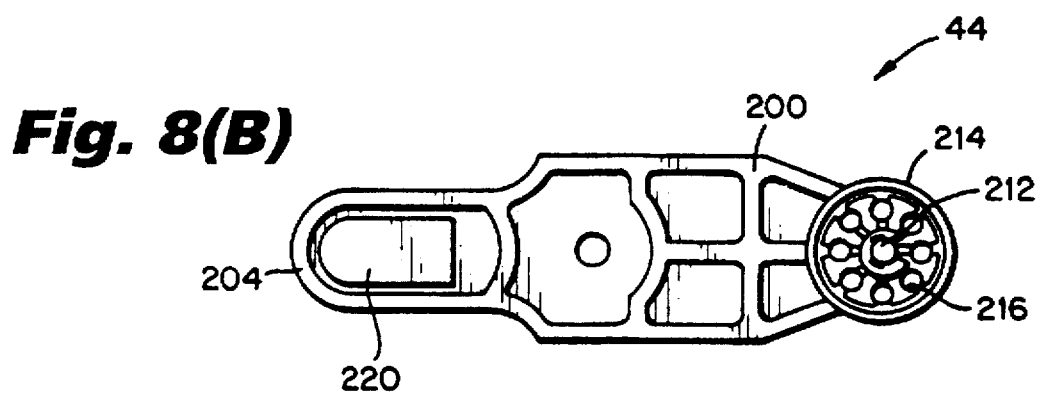
Fig. 8(C)
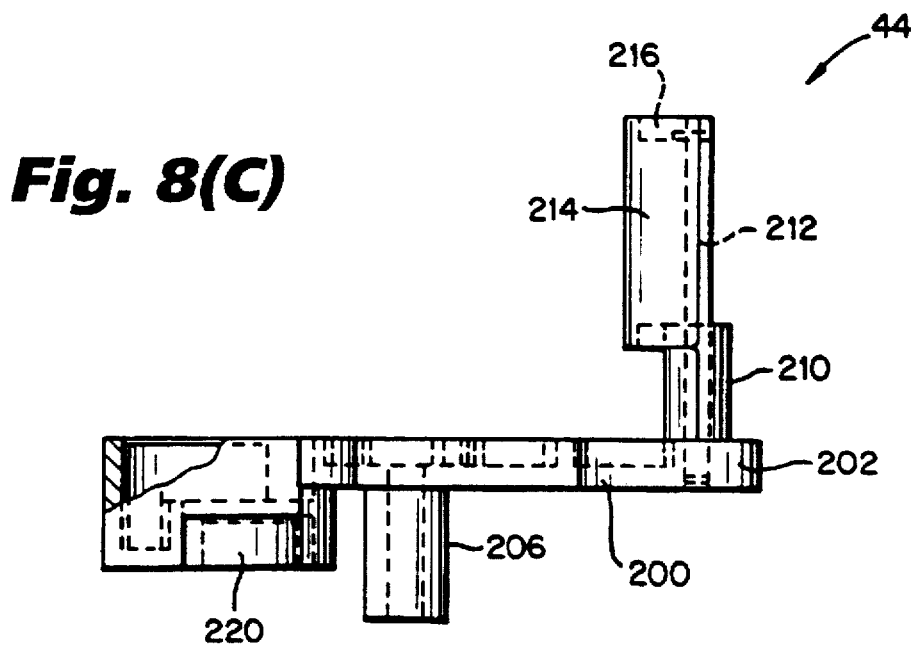

R1

SYNC

SAMPLE a  b  c  d  b  c

SVO FILTER OUT

CAPSTANLESS HELICAL DRIVE SYSTEM

This application is a continuation of the following United States Patents and Applications: U.S. patent application Ser. No. 08/150,730, filed Nov. 12, 1993, entitled "CAPSTANLESS HELICAL DRIVE SYSTEM", now U.S. Pat. No. 5,602,694 and U.S. patent application Ser. No. 08/337,620, filed Nov. 10, 1994, entitled "METHOD AND APPARATUS FOR CONTROLLING MEDIA LINEAR SPEED IN A HELICAL SCAN RECORDER", which in turn is a continuation-in-part application of U. S. patent application Ser. No. 08/150,726, filed Nov. 12, 1993, now abandoned, entitled "METHOD AND APPARATUS FOR CONTROLLING MEDIA LINEAR SPEED IN A HELICAL SCAN RECORDER", all of which are incorporated herein by reference.

BACKGROUND

1. Field of Invention

This invention pertains to method and apparatus for recording information on storage media, and particularly to method and apparatus for transporting and reeling storage media in a helical scan recording system.

2. Related Art and Other Considerations

Numerous prior art patents and publications teach recording and reading of information stored in helical stripes (or "tracks") on magnetic tape. Examples of helical scan tape drives are shown, inter alia, in the following U.S. patents (all of which are incorporated herein by reference):

U.S. Pat. No. 4,835,628 to Hinz et al.
U.S. Pat. No. 4,843,495 to Georgis et al.
U.S. Pat. No. 5,065,261 to Hughes et al.
U.S. Pat. No. 5,068,757 to Hughes et al.
U.S. Pat. No. 5,142,422 to Zook et al.

In a helical scan arrangement, travelling magnetic tape is at least partially wrapped around a rotating drum so that heads (both write heads and read heads) positioned on the drum are contiguous to the drum as the drum is rotated. One or more write heads on the drum physically record data on the tape in a series of discrete stripes oriented at an angle with respect to the direction of tape travel. The data is formatted, prior to recording on the tape, to provide sufficient referencing information to enable later recovery during readout by one or more read heads.

In many prior art helical scan systems, a fixed-radius, capstan is provided to control the linear motion to the tape as the tape travels past the drum. The capstan is driven by a dedicated capstan motor. In capstan systems, a tachometer is typically provided on the capstan to provide feedback information for ensuring constant linear velocity of the tape.

Other helical scan systems (known as "reel-to-reel) do not employ a capstan. Once example of a "reel-to-reel system is disclosed in U.S. Pat. No. 4,125,881 to Eige et al. (incorporated herein by reference). One reel of such a system is typically known as a "supply" reel, the other reel is typically called a "take-up" reel. The supply reel and take-up reels generally each have dedicated motors. Various one-half inch magnetic tape products (such as IBM model 3480) are reel-to-reel streamers with stationary heads or linear tracking.

Generally, prior art capstanless systems involved high speed and high tension operating conditions and a stationary head. Prior art capstanless systems accordingly are inapplicable to helical scan products such as those using 4 mm or 8 mm magnetic tape or other low speed drives generally.

SUMMARY

A capstanless helical scan recording system comprises a supply reel; a take-up reel; and a media transport path extending from the supply reel to the take-up reel. A drum is positioned along the media transport path and has a read head and a write head mounted thereon for recording and reading information in helical stripes on the media. The take-up reel comprises a rotor assembly, a rotating hub assembly, and a gearing system. The rotor assembly includes a sun gear which rotates at a first rotational speed. The rotating hub assembly rotates carries three planetary gears and imparts a velocity to media transported in the media transport path. The gearing system meshes with the rotor assembly and with the hub assembly for causing the hub assembly to have a greater rotational speed than the rotor assembly. The gearing system preferably has a gear ratio on the order of about 8:1. A tension arm (44) protrudes into the media transport path and decouples the supply reel to compenstate for reel runnout during high speed operation. The system has no further means other than the take-up reel and the supply reel for imparting impetus to the media along the media transport path.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 8A is an isometric view of a tensioning arm of the capstanless helical scan recording system of FIG. 1.

FIG. 8B is a top view of the tensioning arm of FIG. 8A.

FIG. 8C is a side view, partially section and partially broken, of the tensioning arm of FIG. 8A.

DETAILED DESCRIPTION OF THE DRAWINGS

Figure 1:
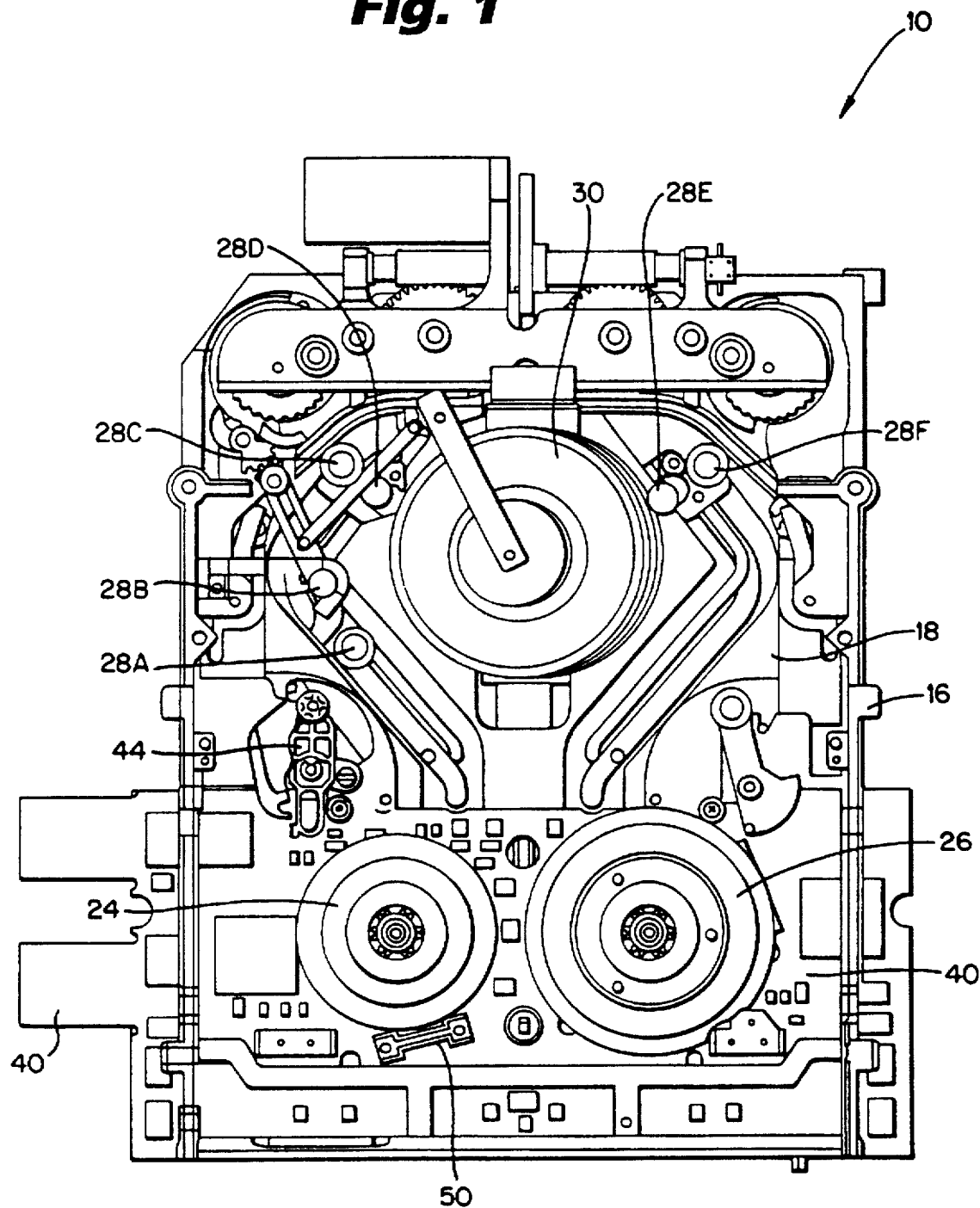
FIG. 1 is a top view of a capstanless helical scan recording system according to an embodiment of the invention.
Figure 2:
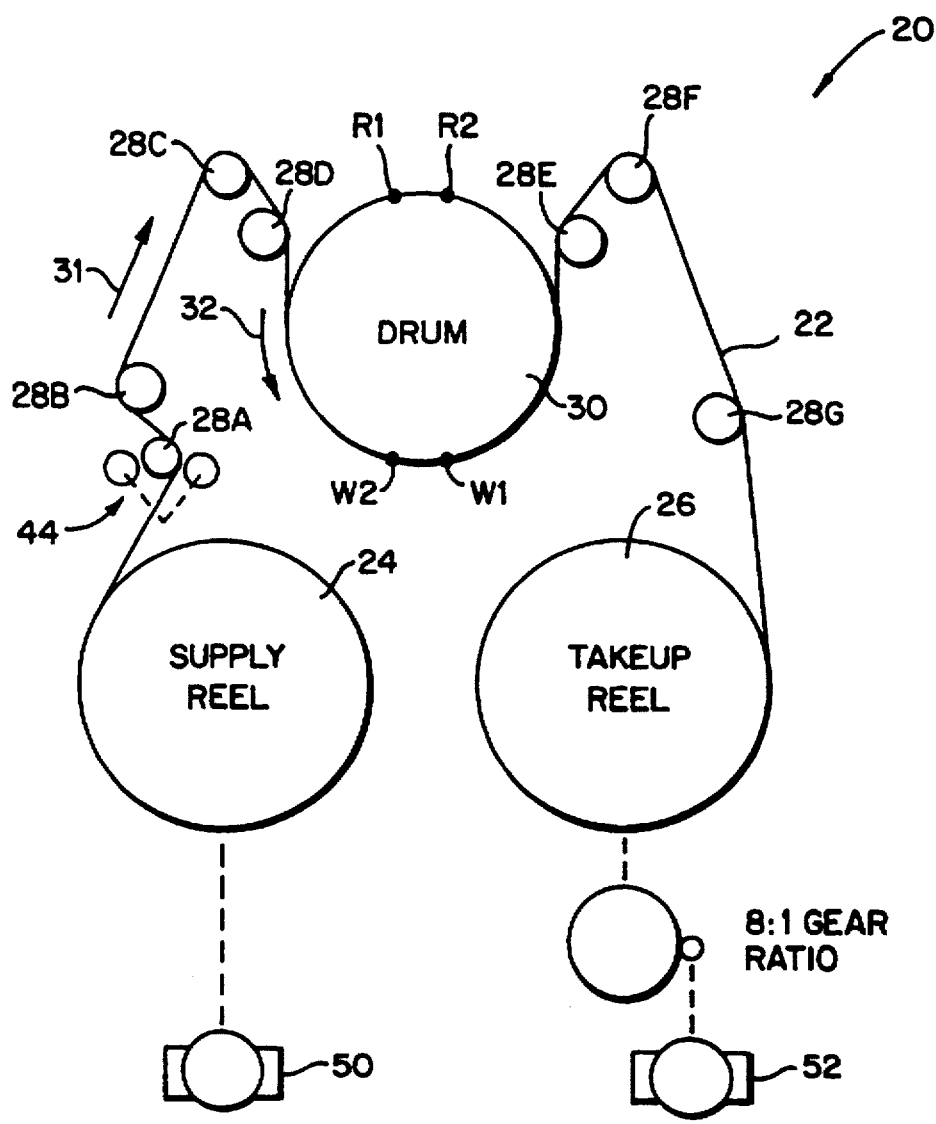
FIG. 2 is a schematic view of a path of media travel in the capstanless helical scan recording system of FIG. 1.

FIG. 1 shows a capstanless a helical scan recording system or drive 14. Helical scan drive 14 includes a drive frame 16 and a deck floor 18. FIG. 2 illustrates generally with reference numeral 20 a tape path for drive 14. In particular, FIG. 2 shows a magnetic tape 22 (such as an 8 mm magnetic tape, for example) having a first end wound around a supply reel 24 and a second end wound around a take-up reel 26. The path traversed by tape 22 is defined at least in part by a series of tape guides 28A–28G and a rotating scanner or drum 30. Tape guides 28 and drum 30 are ultimately mounted on deck floor 18. In all operations excepting a rewind operation, tape 22 travels from supply reel 24 to take-up reel 26 in the direction depicted by arrow 31.

As shown in FIG. 1 and FIG. 2, drum 30 has read heads R1 and R2 as well as write heads W1 and W2 mounted on the circumference thereof (the exact positioning of which will be described below). Drum 30 rotates in the direction depicted by arrow 32. In addition, drum 30 has a servo head S mounted circumferentially thereon. As drum 30 rotates, at any moment a portion of its circumference is in contact with travelling tape. During a recording or write operation, write heads W1 and W2 are periodically positioned to record "stripes" or "tracks" as heads W1 and W2 move in a direction of head travel across tape 22.

Details regarding the positioning of the heads W1, W2, R1, R2 and S, as well as the particular track recording scheme achieved by drum 30, are disclosed in U.S. patent application Ser. No. 08/150,726 (filed Nov. 12, 1993) now abandoned, of Georgis and Zweighaft entitled "Method And Apparatus For Controlling Media Linear Speed In A Helical Scan Recorder" (incorporated herein by reference).

Figure 4:
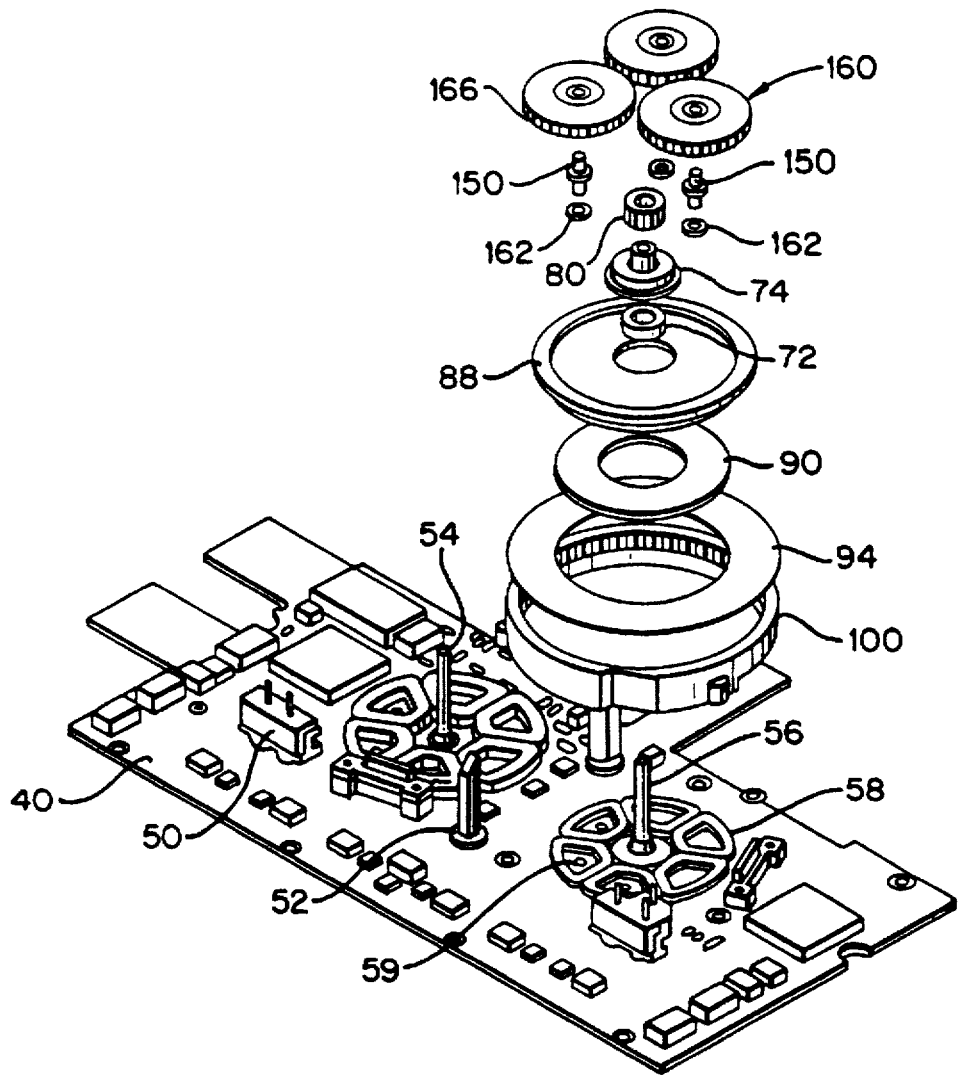
FIG. 4 is an exploded view of the take-up reel assembly of FIG. 3.

FIG. 1 also shows that deck floor 18 has a flexible circuit/return plate assembly 40 positioned thereon as well a tensioning arm 44. As shown in FIG. 4, flexible circuit/return plate assembly 40 has mounted thereon a high resolution quadrature encoder 50 and a brake release 52. In addition, assembly 40 has mounted thereon upstanding stationary shafts 54 and 56 for supply reel 24 and take-up reel 26, respectively. Shaft 56 has an shaft axis 57 which, as illustrated in a horizontally-lying drive 14, extends in a vertical direction (see FIG. 5 and FIG. 6).

Positioned in a circular pattern around each shaft 54, 56 are six motor coils 58. Each motor coil has a Hall sensor 59 centrally positioned therein on assembly 40. Utilization of motor coils 58 and Hall sensors 59 are described in greater detail in U.S. Pat. No. 5,426,355 (filed Nov. 12, 1993) of James Zweighaft entitled "Power-Off Motor Deceleration Control System"as well as in U.S. patent application Ser. No. 08/150,731 (filed Nov. 12, 1993), now abandoned, of James Zweighaft et al. entitled "High Performance Power Amplifier", both of which are incorporated herein by reference.

Take-up reel 26 includes a geared take-up motor illustrated in FIG. 3–FIG. 7. Take-up reel 26 includes a rotor assembly 60 (illustrated in FIG. 6) and a planetary hub assembly 70 (illustrated in FIG. 5).

ROTOR ASSEMBLY

Figure 6:
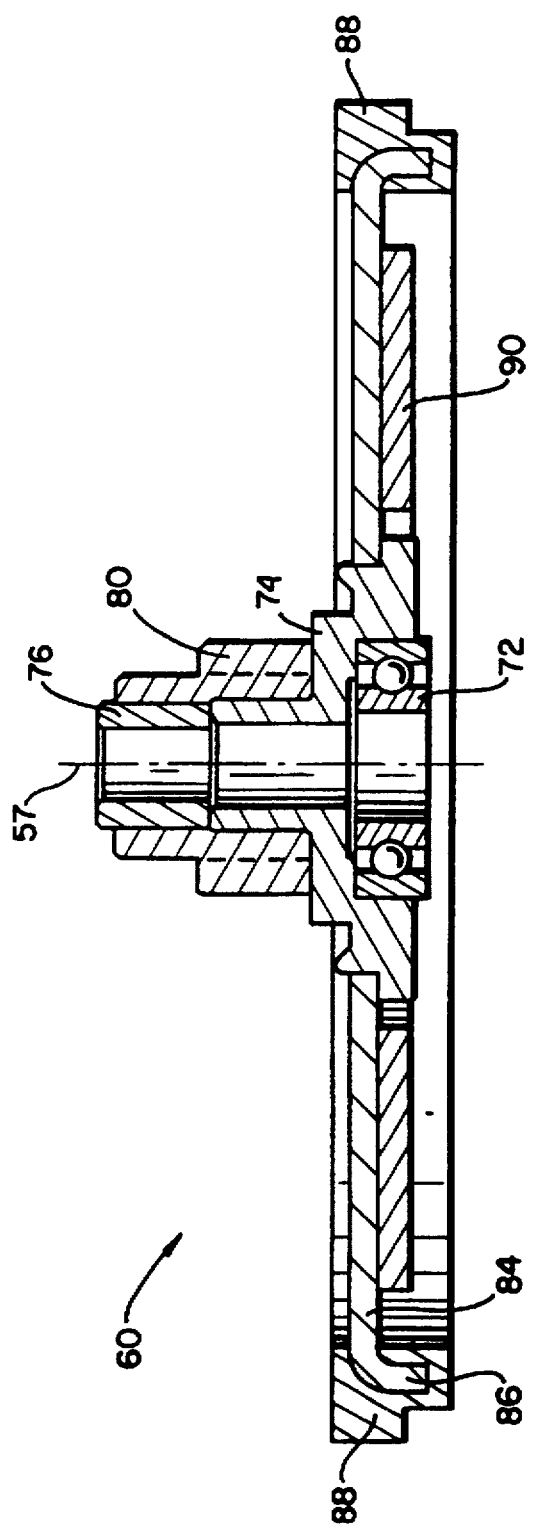
FIG. 6 is a side view, partially sectioned, of a rotor assembly portion of the take-up reel assembly FIG. 3.

As shown in FIG. 6, rotor assembly 60 has ball bearing 72, bearing/gear support housing 74, and insert molded bushing 76 for fitting over shaft 56. Concentrically positioned about a center spindle of bearing/gear support housing 74, and sitting on a highest horizontal shoulder thereof, is insert molded sun gear 80.

On a lower horizontal shoulder thereof, bearing/gear support bushing 74 carries a disk-shaped steel return plate 84. An outer peripheral edge 86 of return plate 84 is bent vertically and carries a tachometer ring 88. On its underside, between bushing 72 and tach ring 88, return plate has mounted thereon a disk-shaped magnet plate 90.

Figure 3:
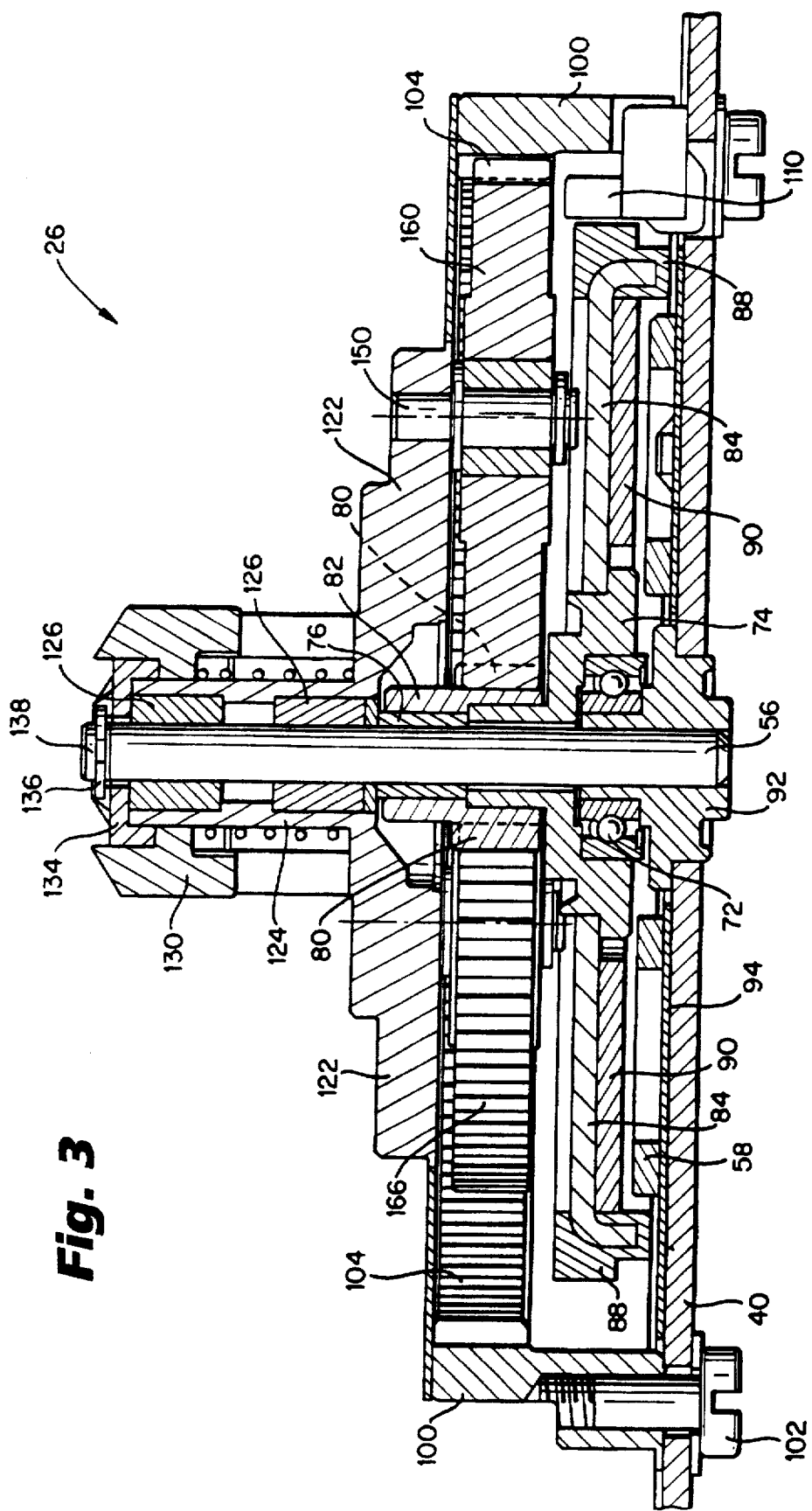
FIG. 3 is a side view, partially sectioned, of a take-up reel assembly of the capstanless helical scan recording system of FIG. 1.

FIG. 3 shows how rotor assembly 60 is mounted on flexible circuit/return plate assembly 40. In particular, shaft 56 is supported on plate assembly 40 by an annular anchor 92. Near its base, anchor 92 has an annular seal 94 extending therearound (see also FIG. 4), upon which coils 58 are mounted. At its top, anchor 92 carries ball bearing 72.

Figure 7:
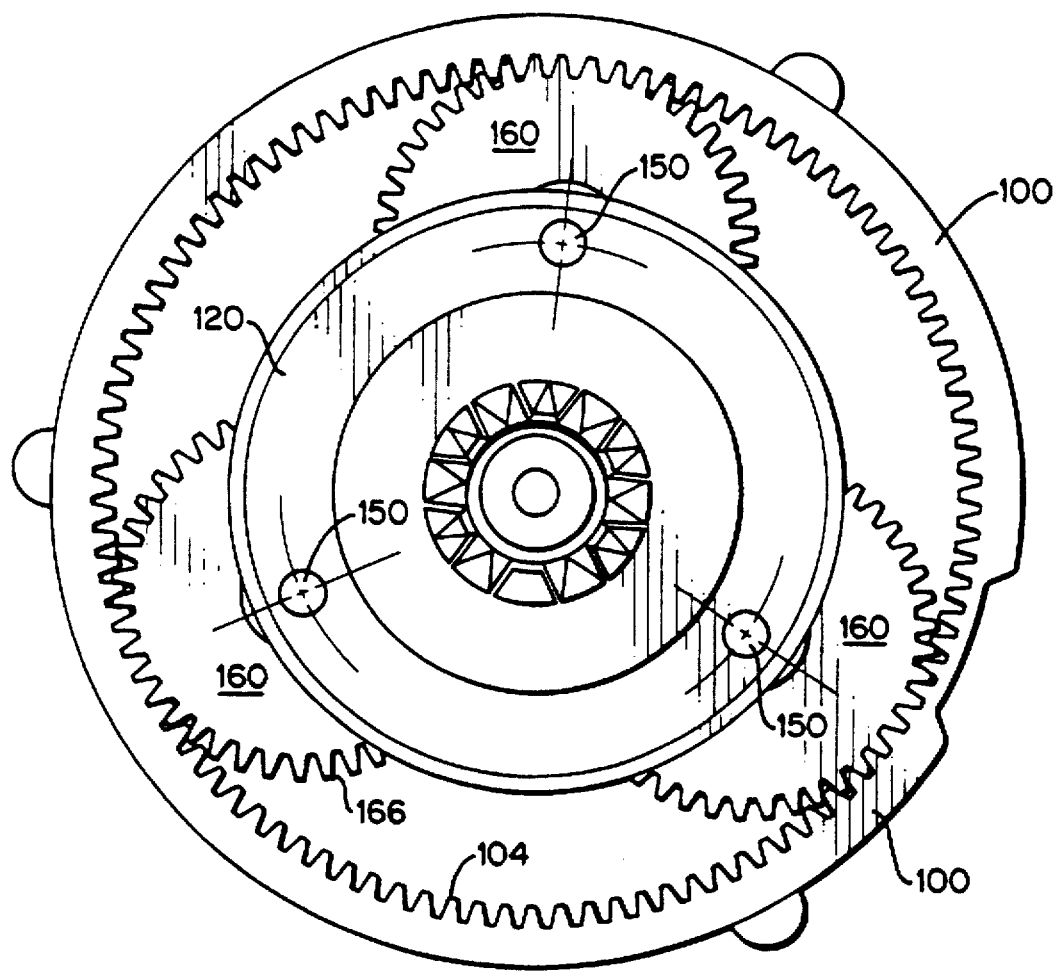
FIG. 7 is a top view of the take-up reel assembly FIG. 3.

As also shown in FIG. 3, flexible circuit/return plate assembly 40 also carries, at the outer periphery of seal 94, a stationary internal gear 100. Internal gear 100 has the shape of a ring, and is mounted on plate assembly 40 by three pins or fasteners 102. As shown in FIG. 3 and FIG. 7, on its upper, interior peripheral surface internal gear 100 has teeth 104.

Flexible circuit/return plate assembly 40 also has mounted thereon a tachometer 110 (see FIG. 3). Tachometer 110 is positioned intermediate plate assembly 40 and internal gear 100 at a selected point on the circumference of take-up reel 26. Tachometer 110 is thus positioned to interface with tachometer ring 88 for providing signals relative to the rotational speed of rotor assembly 60.

From the foregoing discussion, it should be understood that the entire rotor assembly 60 rotates in unison as selected coils 58 are energized for affecting magnet plate 90. The ensuing discussion treats planetary hub assembly 70, the components of which also rotate in unison with one another but at a different speed from rotor assembly 60 in view of a gearing arrangement about-to-be-described.

PLANETARY HUB ASSEMBLY

Planetary hub assembly 70 (shown isolated in FIG. 5) includes an annular retaining plate 120. Retaining plate 120 has a radially extending plate flange 122 as well as a cylindrical, vertically (i.e., axially) extending spindle 124. Retaining plate 120 is provided with a central interior aperture which two bushings 126 mounted therein. Bushings 126 permit retaining plate 120 to rotate about shaft 56.

Figure 5:
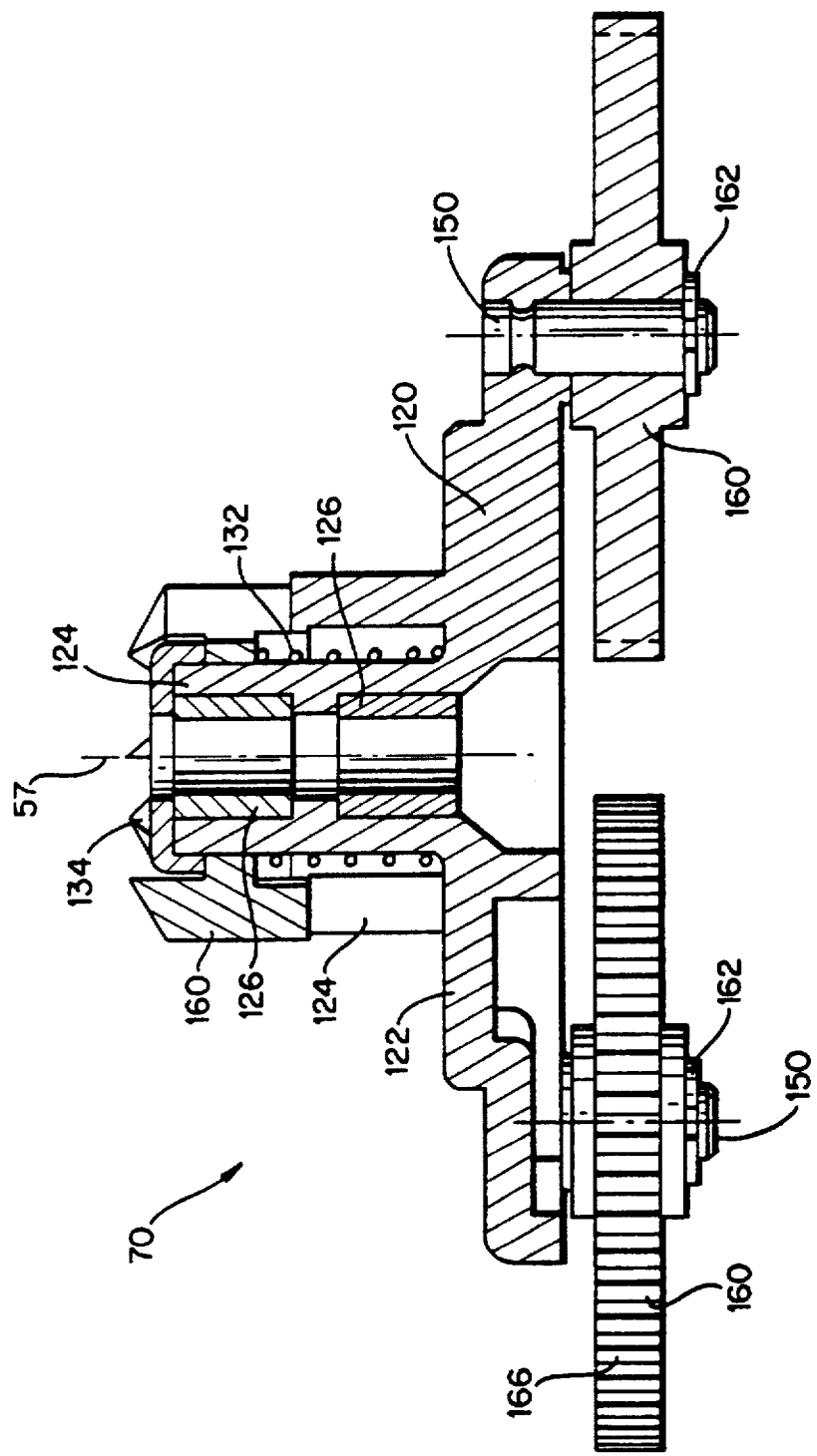
FIG. 5 is a side view, partially sectioned, of a planetary gear assembly portion of the take-up reel assembly FIG. 3.

Spindle 124 is axially slotted as illustrated in FIG. 4. A hub ring 130 is axially positioned atop spindle 124 and concentrically mounted thereabout. Hub ring 130 is also axially slotted. As shown in FIG. 5, a helical spring 132 is concentrically positioned about the outer periphery of spindle 124. A first end of spring 132 rests on plate flange 122; a second end of spring 132 abuts an internal radial flange on hub ring 130. An annular hub cap 134 has a lower surface thereof abutting spindle 124. A retaining washer 136 is mounted to the top of shaft 56 by fastener 138.

Intermediate spindle 124 of retaining plate 120 and an outer peripheral edge of plate 120 are provided three apertures, equally angularly spaced about shaft 56. Each aperture is sized to received a respective gear support pin 150. Gear support pins 150 depend parallel to axis 57 below a lower surface of retaining plate 120. At a distal end of each gear support pin 150 is a respective planetary gear 160 centrally mounted and retained thereon by retaining washer 162. Each planetary gear 160 has gear teeth 166 provided on its outer periphery.

GEARING SYSTEM

The gearing system of take-up reel 26 thus includes sun gear 80 (of the rotor assembly 60); the three planetary gears 160 (of the planetary hub assembly 70); and the stationary internal gear 100.

Table 1 shows the number of gear teeth provided on each gear of the illustrated embodiment. Table 2 shows gear ratios for gears included in the gearing system of the illustrated embodiment.

TABLE 1

| Gear | Number of Teeth |
| --- | --- |
| Sun gear | 14 |
| Planet gear | 42 |
| Internal gear | 100 |

TABLE 2

| Mesh | Ratio |
| --- | --- |
| Sun/Planet | 3 |
| Sun/Internal | 7.14 |
| Planet/Internal | 2.38 |
| Overall (Sun/Internal +1) | 8.14 |

Thus, in the illustrated embodiment, as rotor assembly 60 carrying sun gear 80 rotates, planetary hub assembly 70 rotates about shaft 56 on the order of ⅛ the speed of rotor assembly 60.

TENSIONING ARM

FIG. 8A–FIG. 8C show tensioning arm 44, also known as a "swingarm". The tension arm 44 is positioned along the media path between the supply reel 24 and the first tape guide 28A on the media path. Tensioning arm 44 includes a ribbed horizontal frame member 200. Tensioning arm frame member 200 has a roller end 202 and a tail end 204. Approximately mid-way between ends 202 and 204 a bushing collar 206 depends from an underside of frame member 200. Bushing collar 206 centrally accommodates an unillustrated mounting shaft which extends vertically upward from deck floor 18. By virtue of bushing collar 206, tensioning arm 44 pivots as necessary about the unillustrated mounting shaft.

At its roller end 202, frame member 200 carries a cylindrical spindle mount 210, which in turn centrally carries a vertically up-standing spindle 212. Rotatably mounted about spindle 212 is a roller 214. Roller 214 is axially retained on spindle 212 by a retaining washer 216. The outer circumferential surface of roller 214 selectively forms part of tape path 20 as necessary.

At its tail end 204, frame member 200 carries a magnet assembly 220 on its underside. A counterweight 224 is also provided to counter the presence of roller 214 at the roller end 202. Deck floor 18 is provided with an unillustrated sensor beneath magnet 220 for detecting the position of tensioning arm 44, and thus tension in tape 22.

A range of tensioning arm 44 positions are shown in broken lines in FIG. 2. Tensioning arm 44 is normally spring-biased into the tape transport path 20.

STRUCTURE: SERVO ZONES

Servo zones recorded on at least selected tracks are utilized by the present invention for controlling the linear velocity of tape 22. In the illustrated embodiment, servo zones are recorded on tracks written by write head W2. Tracks written by write head W2 are formatted to have servo zones written at one or more predetermined locations along the track. The choice of particular locations along the track are not material to the present invention, although in the preferred embodiment servo zones are recorded near the beginning, near the center, and near the end of tracks recorded by head W2.

Figure 12:
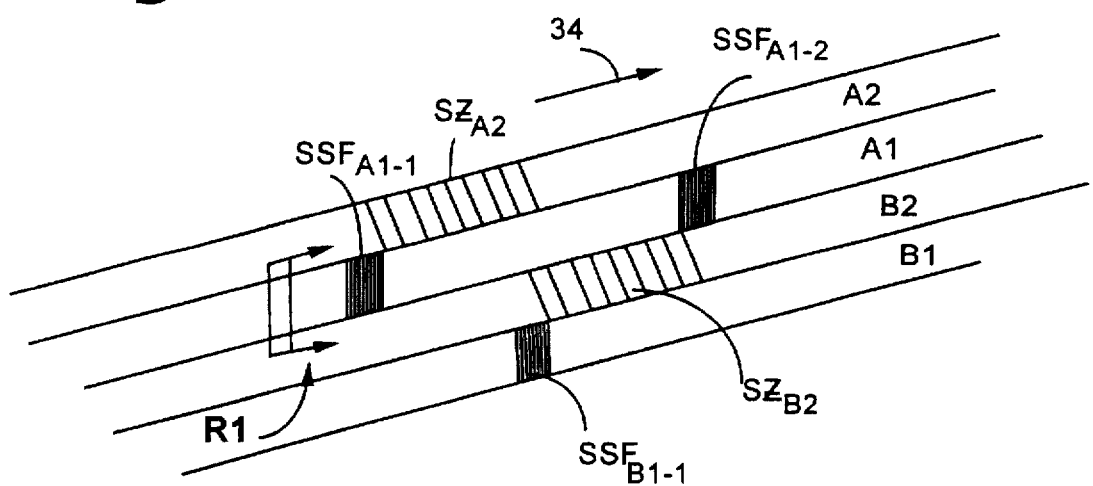
FIG. 12 is a schematic view depicting the location of a servo zone recorded on a track of tape by the helical scan recording system of FIG. 1.

FIG. 12 shows a servo zone $SZ_{B2}$ recorded on track B2 by write head W2, as well as a servo zone $SZ_{A2}$ recorded on track A2 (one drum revolution later) by write head W2. Servo zones $SZ_{B2}$ and $SZ_{A2}$ are recorded at essentially the same distances from the beginning of the tracks in which they lie.

FIG. 12 also shows that tracks recorded by write head W1 are formatted to include a plurality of servo search fields (SSF). In particular, FIG. 12 shows a servo search field $SSF_{A1-1}$ on track A1 in a location just prior to the beginning of the servo zone to-be-recorded on an upstream neighboring track by write head W2 (i.e., servo zone $SZ_{A2}$ on track A2), as well as a servo search field $SSF_{B1-1}$ on track A1 in a location just after the end of the servo zone recorded on a downstream neighboring track by write head W2 (i.e., servo zone $SZ_{B2}$ on track B2). Similarly, track B1 has $SSF_{B1}$ recorded thereon just before the beginning of $SZ_{B2}$ on pair track B2 (other servo search fields on track B1 not being show).

The width of read head R1 is sufficiently large to provide overlap of the two tracks adjacent to the track followed by head R1. The overlap facilitates off-azimuth pick up of signals recorded on the two adjacent tracks.

From FIG. 12 it can further be seen that read head R1, following a track (such as track A1) recorded by head W1, picks up signals from servo zones recorded on adjacent tracks (i.e., tracks recorded by head W2). In view of the helical scan arrangement, as shown in FIG. 12 head R1 will first encounter servo zone $SZ_{A2}$ and then, a predetermined time later, encounter servo zone $SZ_{B2}$ (since the beginning of the respective tracks A2 and B2 are offset with respect to one another along the direction of head travel as depicted by arrow 34). As explained hereinafter, the servo search fields serve as a synchronizing field to alert read head R1 to expect to encounter a servo zone on a neighboring track.

Figure 11:
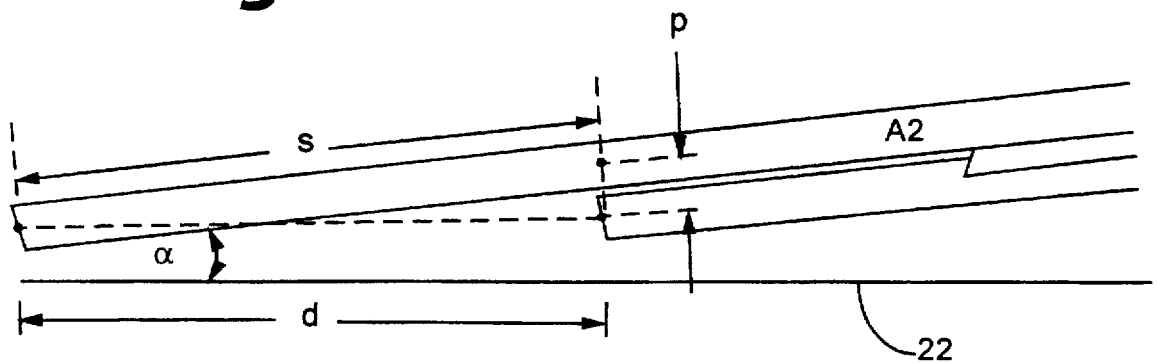
FIG. 11 is a schematic view depicting geometry of a servo zone recorded on a track of tape by the helical scan recording system of FIG. 1.

Reading of servo zones by read head R1 on adjacent tracks is facilitated by the manner in which the servo zones are formatted. FIG. 11 illustrates geometry involved in the format of a servo zone. FIG. 11 shows track pitch P and written track angle α. For an embodiment having a track pitch of 15.5 μm, α=4.8991 degrees, whereas for an embodiment having a track pitch of 10.75 μm, α=4.8954 degrees. FIG. 11 also shows the distance d that tape 22 must move to create track pitch p, as well as track skew s. From the geometry it is readily apparent that s=d÷(cos α)=p÷(tan α).

In accordance with the present invention, the length of the servo zones SZ are formatted to be equal to track skew s (described above). In addition, a servo data tone recorded in the servo zone is recorded by head W2 at a low frequency 530 kHz so that it can be read by the off azimuth read head (i.e., read head R1). The servo search fields (SSFs) on the neighboring tracks recorded by write head W1 comprise a string of all "1"s recorded at a frequency approximately fifty times higher than the frequency of the servo zones. The servo zone frequency of the present invention is thus low enough to read off azimuth, yet high enough to record and overwrite easily.

Thus, as read head R1 traverses stripe A1, read head R1 first picks up the off azimuth servo signals from servo zone $SZ_{A2}$ and, a predetermined time later, picks up the off azimuth servo signals from servo zone $SZ_{B2}$. By comparing the amplitude differences between the signals obtained from servo zone $SZ_{A2}$ and servo zone $SZ_{B2}$, in a manner described in more detail hereinafter, the tape drive system 20 determines an amplitude difference which is used to derive a value head_position_error.

STRUCTURE: DRIVE ELECTRONICS

Figure 10:
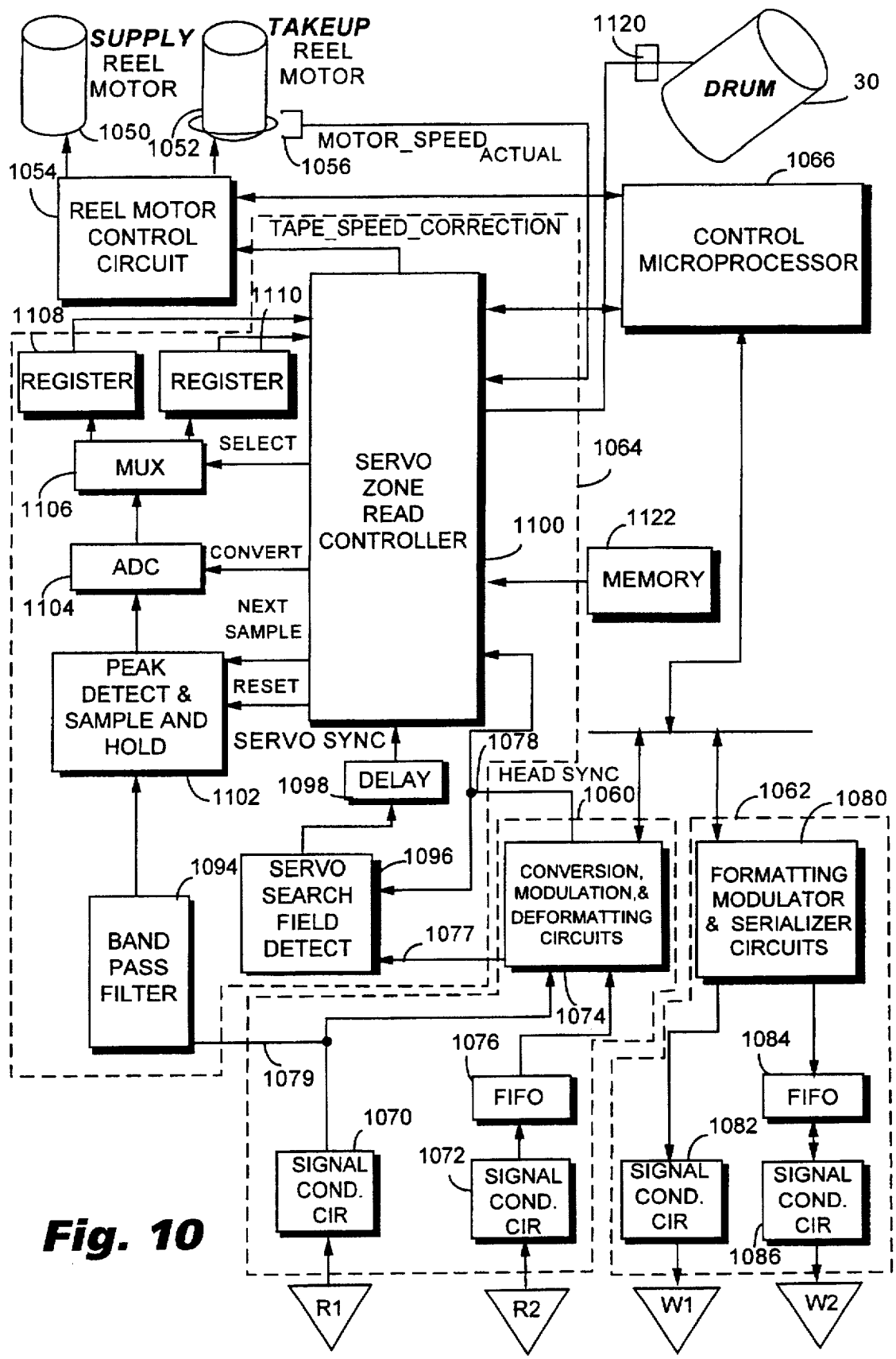
FIG. 10 is a schematic view of electronics included in the helical scan recording system of FIG. 1.

FIG. 10 shows electronics of the tape drive system 20 of the embodiment of FIG. 1, including reel motor 1050 for rotating supply reel 24 and reel motor 1052 for rotating take-up reel 26 and a reel motor control circuit 1054. Reel motor 1052 for take-up reel 26 is provided with a tachometer 1056 which generates a signal motor_speed$_{actual}$. In addition, FIG. 10 shows read signal processing circuitry 1060 involved in processing signals obtained from read heads R1 and R2; write signal preparatory circuitry 1062; and servo signal processing circuitry 1064; all under control of control microprocessor 1066.

Read signal processing circuitry 1060 includes signal conditioning circuits 1070, 1072 for conditioning signals read by read heads R1, R2, respectively. The man skilled in the art will understand that signal conditioning circuits 1070, 1072 include amplifiers and filters. Signal conditioning circuits 1070, 1072 are connected along respective channels to conversion, modulation & deformatting circuits 1074. Intermediate circuits 1074 and signal conditioning circuit 1072 is a FIFO register 1076.

Details of the read signal processing circuitry 60 are understood from the above-referenced and incorporated U.S. Pat. No. 5,068,757 to Hughes et al., entitled "Servo Tracking For Helical Scan Recorder", as well as U.S. Pat. No. 5,065,261 to Hughes et al. entitled "Method and Apparatus for Synchronizing Timing Signals for Helical Scan Recorder", also incorporated herein by reference. For purposes of the present invention, it is sufficient to know that data output from the conversion, modulation, & formatting circuits 1074 is applied on line 1077 to servo signal processing circuitry 1064 and that read signal processing circuitry 1060 produces a timing signal (HEAD_SYNC on line 1078) during each rotation of drum 30. In particular, signal HEAD_SYNC is high at a time at which read head R1 travels over a track written by head W1. In addition, the signals obtained from read head R1 are applied on line 1079 to servo signal processing circuitry 1064.

On the write side, write signal preparatory circuitry 1062 includes formatting, modulation, and serializer circuits 1080. Circuits 1080 are connected to output signal conditioning circuit 1082 for write head W1 and through FIFO register 1084 to output signal conditioning circuit 1086 for write head W2. Details of the circuits 1080 are likewise understood from the above-incorporated patents. In connection with the present invention, the man skilled in the art will understand how write signal preparatory circuitry 1062 prepares servo zones SZ and servo search fields SSF in accordance with the criteria discussed above in connection with FIG. 11 and FIG. 12.

Servo signal processing circuitry 1064 includes a bandpass filter 1094; a servo search field detector 1096; and, a delay 1098. Bandpass filter 1094 receives on line 1079 the conditioned signal obtained by read head R1. Servo search field detector 1096 receives the HEAD_SYNC signal on line 1078. As explained hereinafter, upon detection of a search field SSF, detector 1096 outputs a signal to delay 1098, with delay 1098 thereafter providing a SERVO_ SYNC signal at the time read head R1 is anticipated to be beginning travel over a servo zone.

As further shown in FIG. 10, servo signal processing circuitry 1064 also includes a servo zone read controller 1100 which receives the SERVO_SYNC signal from delay 1098 and thereafter sequences operations involved in reading and processing the servo signals from servo zones SZ. In this respect, servo zone read controller 1100 selectively issues a RESET and NEXT_SAMPLE command to a peak detect & sample and hold circuit 1102; a CONVERT command to an analog-to-digital converter (ADC) 1104; a SELECT command to a MUX 1106.

FIG. 10 further illustrates that output from bandpass filter 1094 is applied to an input terminal of peak detect & sample and hold circuit 1102. Output from peak detect & sample and hold circuit 1102 is applied to an input terminal of ADC 1104. A digital output terminal of ADC 1104 is connected to MUX 1106 which multiplexes a converted value either to register 1108 or register 1110. Upon request, registers 1108 and 1110 are connected to apply values stored therein to a data input port of servo zone read controller 1100.

Controller 1100 is connected to receive the signal motor_ speed$_{actual}$ from take-up reel motor tachometer 1056. Further, controller 1100 receives a signal drum_speed from a tachometer 1120 which is used to monitor revolutions of drum 30. In addition, controller 1100 has access to non-volatile memory 1122 in which are stored various values and constants, including K1, motor_speed$_{ref}$ (the specification speed for take-up reel 26 during a record operation), and K3 (axial offset variance).

An output terminal of servo read zone controller 1100 applies a signal tape$_{13}$ speed$_{13}$ correction to reel motor control circuit 1054. Examples of structural details of reel motor control circuit 1054 are provided in simultaneously-filed U.S. patent application Ser. No. 08/150,727, now U.S. Pat. No. 5,426,355 of James Zweighaft entitled "Power-Off Motor Deceleration Control System" as well as in simultaneously-filed U.S. patent application Ser. No. 08/150,731 of James Zweighaft et al. entitled "High Performance Power Amplifier", now abandoned, both of which are incorporated herein by reference.

OPERATION

Figure 9:
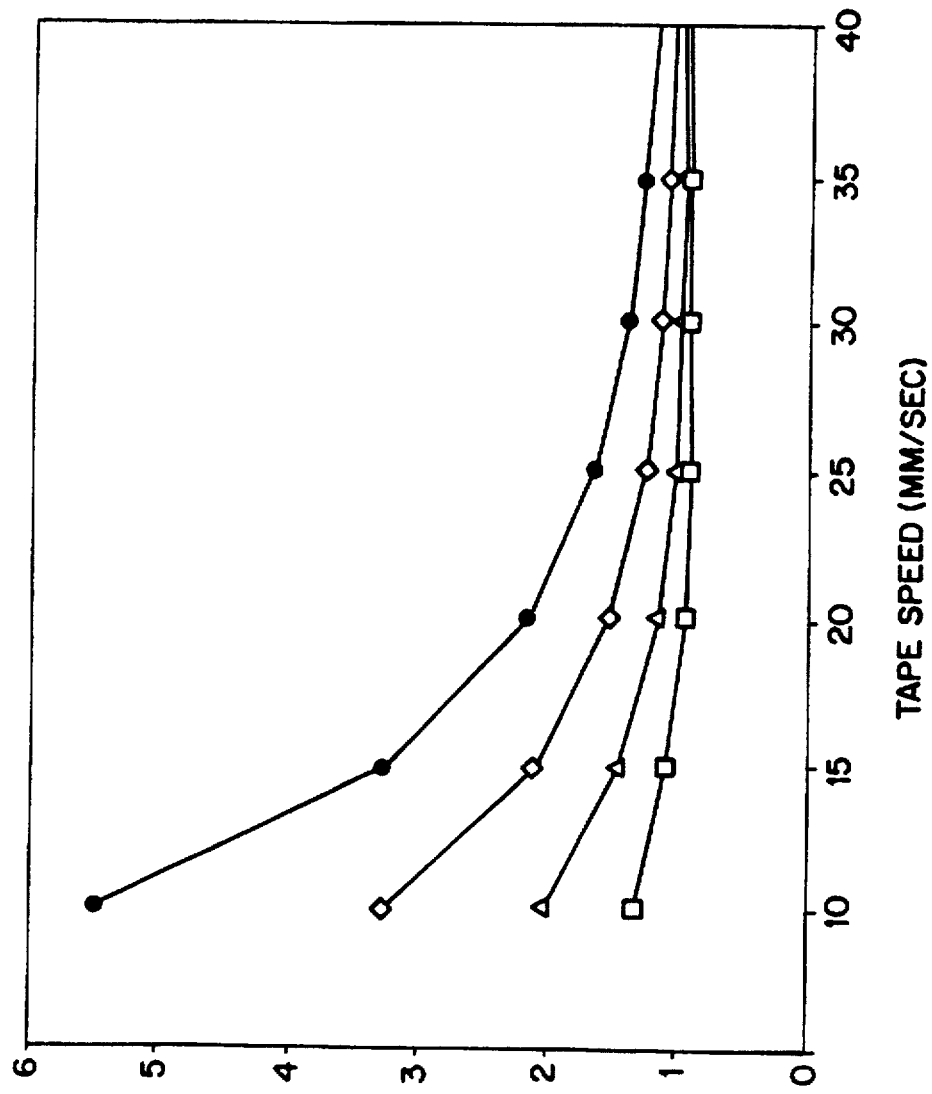
FIG. 9 is a graph showing tape speed variation verses tape speed for various torque ripple levels.

Take-up reel 26 as described above provides the necessary low torque ripple (less than 1%) for achieving low speed velocity control of tape 22 in drive 14. FIG. 9 is a graph showing tape speed variation verses tape speed for various torque ripple levels for drive 14 (assuming the supply reel motor to be held constant at 5%).

Drive 14 utilizes various features in order to obtain enhanced performance. These features include the above-described gearing of take-up reel 26; the usage of quality gears; reduced torque ripple; decoupling of supply reel 24 using tensioning arm 44; and the particular write tracking technique disclosed in U.S. patent application Ser. No. 08/150,726 (filed Nov. 12, 1993) of Georgis and Zweighaft entitled "Method And Apparatus For Controlling Media Linear Speed In A Helical Scan Recorder", now abandoned, (incorporated herein by reference).

Thus, the drive 14 of the present invention offers tape speed control without the use of a capstan by using a precision highly geared take-up reel motor, an in-path speed detection system, and a tension control system. Elimination of a capstan entails elimination of a capstan motor and related components (e.g., bearings, encoder, and associated electronics). Accordingly, problems of capstan alignment are not encountered (e.g., problems of tape edge damage, embedding of particles, distortion of thin media, etc.).

Nor does drive 14 require a conventional pinch roller and its related components, as well as pinch roller alignment issues (including pinch roller misalignment and attendant tape damage). Thus, drive 14 achieves a fewer part count with fewer moving parts, and thus enhanced reliability, less cost, and less tape path space.

By gearing take-up reel 26 with the above-described gearing arrangement, numerous benefits are realized. The approximately 8:1 gear ratio allows take-up reel 26 to stay above 80 RPM with a full reel of tape, thereby keeping the motor away from stick/slip problems (which are typical of capstan motors) in rotating mechanisms at slow speed.

Advantageously, in drive 14 speed variation is reduced due to an increase in takeup motor angular momentum. Due to the gearing, the speed and therefore the angular momentum of the rotor assembly 60 is increased (a flywheel effect).

Speed variation is reduced due to a significant increase in reflected inertia of the take-up reel 26 due to the 8:1 gear ratio. The reflected inertia is the square of the gear ratio and therefore tape (22) sees an inertia of 64 times the actual rotor inertia. This desensitizes the takeup system from outside disturbances.

Speed variation is reduced due to an increase in the torque ripple smoothing. By gearing and therefore running the rotor at higher speeds, the torque ripple frequency increases. This allows the takeup motor/gear system to essentially filter the torque ripple and reduce its effect on speed variation.

Speed variation is reduced due to an increase in sample rate for one feedback loop in the reel to reel speed control system. By gearing the takeup system 8:1, the rotor spins 8 times faster than the tape reel, and since the tach ring is attached to the rotor, the system sees 8 times more tachometer samples than without gearing. This allows for an increase in frequency response in the servo system, and also increased sample averaging which reduces tach jitter effects.

The planetary gear system design has numerous features to minimize speed variation and noise. For example, a very high quality (low runout) plastic sun gear (80) which is insert molded to the rotor of the takeup motor-gear system. Also provide are very high quality plastic planet gears (160), as well as a high quality support plate (122) for the planet gears (160) which has insert molded bearings and insert molded shafts (for the planet gears). Using the insert molding process tolerances which contribute to speed variation and noise are minimized. Further, drive 14 has a high quality metal internal gear (100) which minimizes 1x runout and adds stiffness to the system.

Drive 14 features a high quality takeup motor design which uses a special magnetization pattern for the rotor magnet which significantly reduces motor torque ripple resulting in greatly reduced speed variation.

Tensioning arm 44 located next to supply reel (24) provides numerous advantages, including the following: (1) isolation of the supply reel (24) from the tape path (20); (2) isolation of supply reel torque ripple, and torque drag variation which would otherwise adversely effect speed and tension control; (3) isolation of supply side (low tension) tape slip; (4) isolation of the supply side system mass from the tape path (20) which minimizes tension variation which would otherwise effect speed control; (5) isolation of supply side runout; and, (6) replacement of tape stretching (tension transients) with swing arm motion.

OPERATION: TAPE LINEAR SPEED CORRECTION

The present invention uses the value track_pitch_error to correct the linear velocity of tape 22. As shown in the following expressions, track_pitch_error is a function of only the actual tape speed (i.e., the variable tape_speed$_{actual}$):

Expression 1 track_pitch$_{ref}$=tape_speed$_{ref}$+drum_speed×sin ($\alpha$)

Expression 2 track_pitch$_{actual}$=tape_speed$_{actual}$+drum_speed×sin ($\alpha$)

Expression 3 read_head_delay_factor=$\theta$/360°

Expression 4 track_pitch_error=(track_pitch$_{ref}$−track_pitch$_{actual}$)× (read$_{13}$ head_delay_factor)

Expression 5 track_pitch_error=(tape_speed$_{ref}$−tape_speed$_{actual}$)× (sin($\alpha$)×$\theta$+drum_speed÷360°)

where tape_speed$_{ref}$, sin ($\alpha$), drum_speed, and $\theta$ are all system constants.

Thus, in particular, a value for the variable tape_speed_correction is determined from the following Expression 6:

Expression 6 tape_speed_correction=[K1×(tape_radius×(motor_speed$_{ref}$−motor_speed$_{actual}$))]+(K2×(track_pitch_error+ K3))

whose terms are defined by Table 3. In Table 3, it will be understood that the values $\theta$, drum_speed, sin ($\alpha$), and tape_speed$_{ref}$ are constants for a given recording format, and $\alpha$ is the recording (track) angle.

TABLE 3

| Term | Definition |
| --- | --- |
| K1 (constant) | a system damping constant for stablizing the control system [depending upon such system-specific parameters as motor torque constant, amplifier gain, motor resistance, motor inductance, motor damping, for example] (stored in memory 1122) |
| motor_speed$_{ref}$ | the required speed of the take-up reel during a write operation calculated as (tape_speed$_{ref}$/tape_radius) |
| motor_speed$_{actual}$ | the actual speed of take-up reel as sensed by tachometer 1056 |
| K2 | (drum_speed * 360) ÷ $\theta$ · sin ($\alpha$), wherein $\theta$ is the angular distance between W2 and R2; drum_speed is obtained from drum tachometer 1120; and $\alpha$ is recorded track angle |
| track_pitch_error | computed by controller 1100 |
| K3 (constant) | axial offset variance: a constant reflecting any deviation of vertical displacement of heads W2 and R2 from specification (stored in memory 1122) |
| tape_radius | the latest calculated or measured value of the radius of the reel tape pack |

The value of the parameter tape_radius can be determined by any of several known techniques. In the illustrated embodiment, both reel motors are equipped with angular position sensors known as tachometers. If the tape is loaded and rewound to its beginning ("BOT"), the radius of both reels can easily be found by moving the tape forward and comparing the output of the tachometers. By definition, the takeup reel has minimal tape wound on it at BOT, so its radius is equal to the known radius of its hub. The supply reel radius is determined by multiplying the known takeup reel radius by the ratio of the output of the two tachometers (i.e., the ratio of the output of the takeup reel tachometer and the supply reel tachometer), as in Expression 7:

Expression 7

$$SUPPLY_{radius} = TAKEUP_{radius} * (Ttach/Stach)$$

where:

$SUPPLY_{radius}$=radius of the supply reel (unknown)
$TAKEUP_{radius}$=radius of the tapeup reel (known at BOT)
Ttack=output of the takeup reel tachometer (measured)
Stack=output of the supply reel tachometer (measured)

Since the total amount of tape is fixed for a given reel, so is the total surface area as indicated by Expression 8:

Expression 8

$$PI*SUPPLY_{radius}^2 + PI*TAKEUP_{radius}^2 = K4$$

where:

K4 is a known constant
PI=3.14159. The value of K4 does not change as tape is transferred from one reel to the other. The constant K4 can be used along with the ratio of the angular motion from the tachometers at any time to determine the radius of either reel by solving the system of two equations with two unknowns (Expressions 7 and 8).

In view of numerous parameters in Expression 5 being constants or otherwise determined as described above, the value track_pitch_error (see Expression 5) is directly proportional to tape_speed$_{actual}$. In other words, deviation in tape_speed$_{actual}$ from tape_speed$_{ref}$ can be measured on a track-by-track basis via track_pitch_error. Thus, it is seen that the actual linear tape speed can be determined and controlled by measuring the track pitch error. As used herein, track pitch error is an example of track pitch information.

The larger the angle θ, the larger the effect that can be measured by track_pitch_error (e.g., by the tracking error). Since it is advantageous to maximize signal-to-noise ratio, it is advantageous to maximize θ. Angle θ can be made larger by further displacing head heights vertically on drum 30. Whereas in the prior art, the radial separation of heads was 180 degrees apart to obtain a head vertical displacement for ½ track pitch, the present invention radially separates heads by 540 degrees to obtain a head vertical displacement of 1.5 track pitch with attendant improvement in the value of track_pitch_error.

Determination of the value tape_speed_correction by servo zone read controller 1100 will now be described primarily with reference to FIG. 10 and FIGS. 13A–13D and the particular example of read head R1 traversing track A1 of FIG. 12. As it does once per revolution of drum 30, read signal processing circuit 1060 causes signal HEAD_SYNC to go high when read head R1 is over a track recorded by head W1. When signal HEAD_SYNC goes high on line 1078, servo search field detector 1096 begins looking for search field SSF$_{A1-1}$. The line of FIG. 13 labeled "R1" shows signals obtained by head R1 while traversing the servo search field SSF$_{A1-1}$ (and thereafter the essentially consecutive off-azimuth signals obtained from servo zones SZ$_{A2}$ and SZ$_{B2}$).

Detector 1096 receives data from read signal processing circuit 1060 on line 1077. Upon detection of the string of "1"s comprising search field SSF$_{A1-1}$, detector 1096 generates a signal to delay 1098 corresponding to the rising edge of the pulse shown in the line of FIG. 13A labeled "SYNC". After a predetermined interval of time (one microsecond), delay 1098 generates the signal SERVO_SYNC (corresponding to the falling edge of the pulse shown in line "SYNC") for application to controller 1100.

In parallel with the generation of the signals HEAD_SYNC and SERVO_SYNC, the actual conditioned signal obtained by read head R1 (from track A1 and off azimuth signals from neighboring tracks) are applied on line 1079 to the bandpass filter 1094. The filtered output of bandpass filter 1094 is shown in FIG. 13D by the line labeled "Svo Filter Out".

Controller 1100 issues a NEXT_SAMPLE signal to peak detect & sample and hold circuit 1102. In particular, the NEXT_SAMPLE signal is issued by controller 1100 a predetermined time interval after controller 1100 receives signal SERVO_SYNC. This predetermined interval, corresponding to the reaction time of bandpass filter 1094, is illustrated by the first letter "b" in the line of FIG. 13C labeled "Sample". In the illustrated embodiment, this predetermined time interval "b" is on the order of about eight microseconds.

Figure 13A:
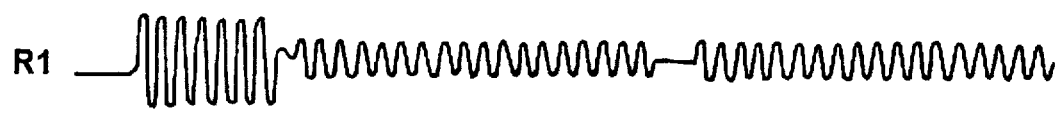
FIGS. 13A, 13B, 13C, 13D show is a timing chart showing waveforms and values obtained in reading servo zones recorded by the helical scan recording system of FIG. 1.
Figure 13B:
Figure 13C:
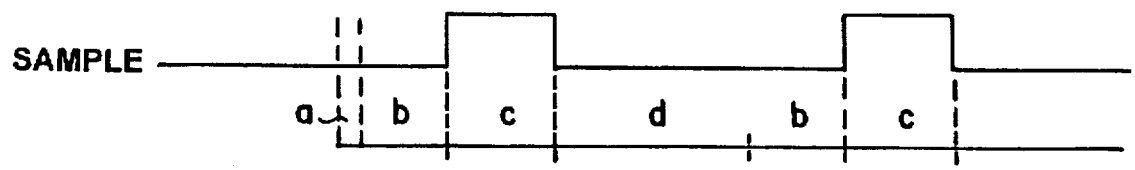
Figure 13D:

Upon receipt of the NEXT_SAMPLE command, peak detect & sample and hold circuit 1102 samples the filtered signal read by head R1 for the time interval shown as the first letter "c" in line "Sample" of FIG. 13C. During interval "c", the peak amplitude of the off azimuth signal obtained by read head R1 from servo zone SZ$_{A2}$ is detected. Interval "c" lasts on the order of about five microseconds, including two microseconds of peak detection. After a five microsecond timeout, the peak amplitude from servo zone SZ$_{A2}$ is gated to ADC 1104 and controller 1100 issues a CONVERT command to initiate analog-to-digital conversion of the peak amplitude value from servo zone SZ$_{A2}$.

The digital output of ADC 1104 is gated to MUX 1106. Microprocessor 66 then determines to which of registers 1108, 1110 the digitally converted peak amplitude value should be routed for storage, and accordingly applies an appropriate value of signal SELECT to MUX 1106 to effect the routing. For the sake of the present discussion, peak amplitude values from track A2 are routed to register 1108 while peak amplitude values from track B2 are routed to register 1110.

After completion of peak detection and sample hold for the signal from servo zone SZ$_{A2}$, controller 1100 issues a RESET command to peak detect & sample and hold circuit 1102. Thereafter, controller 1100 waits a predetermined time before issuing a further NEXT_SAMPLE command. This predetermined waiting time is preset in order to provide head R1 sufficient time to move along track A1 in direction 34 a sufficient distance to be able to pick up off azimuth signals from servo zone SZ$_{B2}$ recorded on track B2. This predetermined waiting time is depicted as the interval denoted by adjacent letters "d" and "b" in line "Sample" of FIG. 13C, and is on the order of about thirteen microseconds. Thus, this predetermined waiting time includes the reaction time of bandpass filter 1094.

After elapse of the predetermined waiting time, the command NEXT_SAMPLE is issued to enable peak detect & sample and hold circuit 1102 to obtain the peak amplitude for the servo signals recorded in servo zone SZ$_{B2}$. Peak detection and sample hold again occur for an interval "c", followed by digital conversion and storage in the same manner as aforedescribed. However, the digitally converted peak amplitude from servo zone SZ$_{B2}$ is stored in register 1110 rather than register 1108.

When the peak amplitude of servo zone SZ$_{A2}$ is stored in register 1108 and the peak amplitude of servo zone SZ$_{B2}$ is stored in register 1110, controller 1100 takes the mathematical difference the two amplitudes to obtain the value track_pitch_error. Further, in accordance with the above Expression 6, controller 1100 determines a value for tape_speed_correction using the value track_pitch_error as well as other inputs described above, including motor_speed$_{actual}$ from tachometer 1056 on take-up reel motor 1052; and calculated motor_speed$_{ref}$, θ, K1, K2, and K3 (axial offset variance) stored in memory 1122.

It should be understood that the foregoing steps are repeated for each paired occurrence of servo zones. For example, in the embodiment above described, servo zones are read not only near the beginning, but also near the center and ends of tracks written by head W2. In this respect, while head R1 is traversing a track, servo search field detector 1096 monitors the signals on line 1077 for the next servo search field SSF until the end of track is encountered.

Thus, from the foregoing it is seen that the servo search field information (e.g., SSF) is recorded at normal (high) data frequencies in the odd numbered tracks, just preceding the occurrence of the low frequency servo burst (e.g., $SZ_{A2}$) in the adjacent even numbered track, for which they serve as a marker. After read head R1 for the odd numbered track encounters the servo search field (SSF) signal, servo controller (100) starts a timer (98) used to determine when read head R1 is beside the servo burst (e.g., $SZ_{A2}$) written in the adjacent track. Because read head R1 is deliberately made somewhat wider than one track (typically 50% wider), part of read head R1 will overlap the servo burst (SZ) at this time, even if the centerline of read head R1 is directly over the centerline of the odd numbered track. On its other side, read head R1 will typically also overlap the opposite even numbered track. The tape format is arraigned to have a high frequency signal recorded in this area.

When positioned along side a servo burst (SZ), the output of read head is a combination of signals from three tracks: high frequency from the odd numbered track with which read head R1 is substantially aligned, plus two smaller signals: low frequency from the side of read head R1 which overlaps the servo burst, plus high frequency from the opposite side which overlaps the third track. Frequency filtering easily separates the low frequency servo burst from the high frequency signals.

As mentioned above, in this dual azimuth system a slight tilt (azimuth) is added to both write head W1 and read head R1 for the odd numbered tracks, while an opposite tilt is applied to write head W2 and read head R2 for the even numbered tracks. This technique facilitates separating the three signals because the low frequency servo signal is substantially unaffected by azimuth loss, while the high frequency read from the other side of the read head is attenuated due the mismatched azimuth.

The extent to which read head R1 overlaps the servo burst SZ determines the amplitude of the low frequency signal. If read head R1 is slightly off center of the odd numbered track, biased toward the servo burst SZ on the even numbered track, read head R1 will pick up more of the low frequency servo signal. If read head R1 is off center in the opposite direction, less of head R1 will overlap the servo burst SZ and consequently the low frequency signal will be smaller. This overlap constitutes a direct measure of track pitch and is the basis of the speed correction factor calculated by microprocessor 66 and applied to the reel motors 1050, 1052.

Because signal amplitude can also vary with many other factors such as the quality of the tape, the servo zones SZ are read in pairs and the difference between them is used as the error signal.

The relative placement of the read heads and write heads directly affects the "gain" of this track pitch signal, meaning how much the servo signal amplitude changes for a given change in linear tape speed. If the read heads are placed close to the write heads the effect is nil. The further apart on the drum they are placed, the higher the gain. For reasons of crosstalk from the write to the read heads, it is common practice to place them opposite of each other on the scanner (e.g., drum 30). If writing occurs for one-half a turn of drum 30, the read heads can be active when the write heads are not operating, thus avoid "crosstalk".

Heads placed 180 degrees apart on drum 30 must also be shifted slightly in a direction parallel to the axis of rotation of the drum to account for the distance the tape moves in the time it takes for the read heads to catch up to the data being written earlier. This direction parallel to the axis of rotation of the drum is referred to as the "down" direction. This shift in position can occur in discrete amounts corresponding to the track pair pitch (distance between pairs of tracks). Thus read heads placed 180 degrees apart from the write heads must be shifted n*0.5 track pair pitches down, where n can be 1, 2, 3 or more. In a system with the read heads displaced 0.5 track pitches down, they will encounter the track just 180 degrees after it was written. If n=2, the read heads will encounter the track 180+360=540 degrees after it was written, and so on. In the preferred embodiment, n≧2 and preferably n=2.

The value of K3 can be determined from the methods disclosed in U.S. patent application Ser. No. 08/150,733 (filed Nov. 12, 1993) of Hughes et al. entitled "Method and Apparatus For Determining And Using Head Parameters in a Helical Scan Recorder" (incorporated herein by reference), now abandoned,.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

We claim:

1. A capstanless helical scan recording system which records information on a storage media, the system comprising:
    a supply reel;
    a take-up reel;
    a take-up reel motor;
    a media transport path extending from the supply reel to the take-up reel;
    a drum positioned along the media transport path and upon which a read head and a write head are mounted for recording and reading information including servo information in helical stripes on the media; and,
    a controller which drives the take-up reel motor during a recording operation in which the write head records information on helical stripes on the media, wherein the controller uses servo information recorded on the media by the write head during the recording operation and read back from the media by the read head during the recording operation for determining how the take-up reel motor is to be driven during the recording operation for imparting a required linear velocity to media transported in the media transport path.

2. The capstanless helical scan recording system of claim 1 wherein the take-up reel comprises:
    a rotor assembly which rotates at a first rotational speed imparted by the take-up reel motor;
    a rotating hub assembly which rotates at a second rotational speed which imparts a linear velocity to media transported in the media transport path;

a gearing system meshing with the rotor assembly and with the hub assembly for causing the second rotational speed to be less than the first rotational speed.

3. The capstanless helical scan recording system of claim 2, wherein the gearing system has an overall gear ratio on the order of about 8:1.

4. The capstanless helical scan recording system of claim 2, wherein the rotor assembly includes a sun gear and wherein the hub assembly includes a planetary gear which meshes with the sun gear.

5. The capstanless helical scan recording system of claim 1, further comprising a tension arm which protrudes into the media transport path for selectively decoupling the supply reel from the take-up reel.

6. The capstanless helical scan recording system of claim 5, wherein the tension arm is positioned along the path between the supply reel and a first guide on the path.

7. The capstanless helical scan recording system of claim 1, wherein the system has no further means other than the take-up reel and the supply reel for imparting impetus to the media along the media transport path.

8. The capstanless helical scan recording system of claim 1, wherein the supply reel is coupled to the take-up reel only by the media.

9. The capstanless helical scan recording system of claim 1, further comprising:
   a write formatter for formatting write information including the servo information and for transmitting, during the recording operation, at least the servo-information to the write head so that the servo information may be recorded in at least some of the helical stripes; and
   wherein the controller is connected to analyze, during the recording operation, the servo information read back by the read head subsequent to recording thereof by the write head, the controller using the servo information to generate a signal for application to the take-up reel motor for controlling linear velocity of the media during the recording operation.

10. The capstanless helical scan recording system of claim 1, wherein the write head and the read head are positioned on the drum so that during a drum revolution the read head reads servo information recorded on a track at least 1.5 track pitches upstream from the most recently recorded track.

11. The capstanless helical scan recording system of claim 1, wherein the write head and the read head are radially positioned apart by at least 540 degrees of vertical drum angular displacment on the drum.

12. A method of operating a helical scan recording system which records information on a storage media, the method comprising:
   moving media along a capstanless media transport path from a supply reel and past a drum to a take-up reel and using a write head on the drum to record information including servo information on the media during a recording operation;
   using a read head on the drum to read back, during the recording operation, the servo information recorded in helical stripes on the media by the write head during the recording operation; and,
   using the servo information read from the media by the read head during the recording operation to determine how a take-up reel motor is to be driven for imparting a required linear velocity to the media transported in the media transport path during the recording operation.

13. The method of claim 12, further comprising selectively decoupling the supply reel from the take-up reel using a tension arm which protrudes into the media transport path.

14. The method of claim 12, further comprising:
   formatting write information including the servo information and transmitting, during the recording operation, at least the servo information to the write head so that the servo information may be recorded in at least some of the helical stripes;
   analyzing, during the recording operation, the servo information read back by the read head subsequent to recording thereof by the write head;
   using the servo information to generate a signal for application to the motor for controlling linear velocity of the media during the recording operation.

15. The method of claim 14, wherein during the recording operation the read head reads servo information recorded on a track at least 1.5 track pitches upstream from the most recently recorded track.

* * * * *